C. H. MINSHALL.
DEVICE FOR USE IN CONNECTION WITH PRACTISING GOLF.
APPLICATION FILED DEC. 10, 1912.
1,094,236. Patented Apr. 21, 1914.
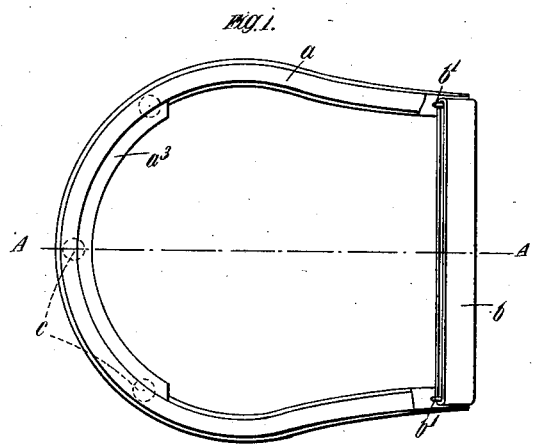
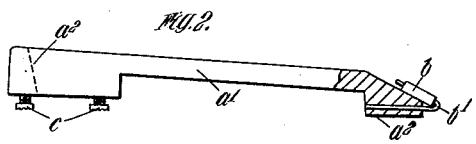
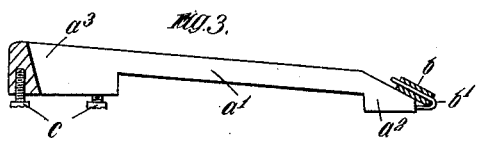
Witnesses:
M. E. Shook
F. Muirhead
Inventor:
Charles H. Minshall
By Edson Bros.
Attorneys

UNITED STATES PATENT OFFICE.

CHARLES HAMILTON MINSHALL, OF EXMOUTH, ENGLAND.

DEVICE FOR USE IN CONNECTION WITH PRACTISING GOLF.

1,094,236.

Specification of Letters Patent.

Patented Apr. 21, 1914.

Application filed December 10, 1912. Serial No. 736,003.

*To all whom it may concern:*

Be it known that I, CHARLES HAMILTON MINSHALL, a subject of the King of Great Britain, residing at St. Martins, Portland avenue, Exmouth, in the county of Devon, England, have invented certain new and useful Improvements in Devices for Use in Connection with Practising Golf, of which the following is a specification.

This invention relates to a device for use in connection with practising golf, and has for its chief object to enable the "putting" shot or stroke to be practised or played. The device is primarily intended for indoor use, as it is especially suitable for placing on a carpet or the like so as to serve as a substitute for the hole in the putting green.

According to this invention the device is in the form of a frame which is so constructed and arranged that when placed on the carpet or the like it forms an inclosure into which the ball must be driven or propelled through a suitable opening by the player. The frame is preferably U-shaped and its mouth or opening may be provided with an obstructing member which is so arranged as to permit the ball when accurately and correctly driven to enter the frame but acts as an obstruction to stop or arrest the travel of the ball if it is not correctly driven. The rear inner surface of the frame is beveled or inclined so that the ball if driven too hard will be directed out of the frame. Adjustable supporting feet may be provided for enabling the height of the frame above the level of the carpet or the like to be varied as desired.

In order that the invention may be clearly understood and readily carried into effect the same will now be described more fully with reference to the accompanying drawings in which:—

Figure 1 is a plan view of one construction of the improved device drawn to reduced scale. Fig. 2 is a side elevation, partly in section and Fig. 3 is a sectional elevation on the line A—A of Fig. 1.

$a$ represents the frame constructed of any appropriate metal and as shown in Fig. 1 is approximately U-shaped. $b$ is the aforesaid obstructing member which in the example shown is an elastic or rubber band extending across the mouth or opening of the frame so as to lie in the path of the ball if the latter is traveling so that it would enter the frame. The ball in being driven into the frame invariably comes into contact with the rear part thereof, and this part is preferably made higher than the remaining part of the frame. The bottom of the frame is provided with the adjustable supporting feet, which in the example shown, are in the form of screws $c$, and by means of these screws the height of the rear portion of the frame can be varied relatively to the level of the carpet. The screws slightly sink into the carpet and thus prevent the frame from being moved as a result of the ball striking it.

Portions of the frame are cut away as shown at $a'$ and the ends of the frame are formed as feet $a^2$ $a^2$. Instead of providing these cut away portions, the frame may be solid throughout so that the whole of it is in contact with the carpet. The rear portion of the frame is beveled or inclined on its inner surface as shown at $a^3$ (see Fig. 3) so as to direct the ball out of the frame if driven too hard.

The ends or feet $a^2$ $a^2$ of the frame in the example shown, are provided with projections or pins $b'$ $b'$ which are embedded in the material of the frame and bent to lie at a suitable inclination. The rubber band $b$ is secured to the pins $b'$ $b'$ so as to lie at a suitable angle with relation to the carpet and in close contact therewith to enable the ball when traveling at the correct speed to pass over the same. Instead of employing the pins $b'$ $b'$ for retaining the rubber band in position the ends or feet of the frame may be slotted to form projections or the like around which the rubber band is held.

The area inclosed by the frame, is approximately equal to the area of the hole in the putting green and the position of the rubber band with relation to the inclosed area is such that if a ball is played or driven toward the mouth of the frame and is traveling at the correct speed, that is at a speed which in the ordinary way would cause it to drop into the "putting" hole it will surmount the obstructing member or band so as to enter the frame. If, however, the ball is traveling at such a speed that in the ordinary way it would not enter the putting hole, it will not be traveling fast enough to enable it to surmount the obstructing member. If the ball is traveling at such a speed that in the ordinary way would cause the ball to pass over the hole, the ball will enter the frame and will strike the inclined or beveled surface $a^3$ with such force that it will be directed out of the frame.

What I claim and desire to secure by Letters Patent of the United States is:—

1. A device for use in connection with practising golf comprising in combination, a frame having a suitable opening through which the ball is driven and a deformable obstructing member located across said opening.

2. A device for use in connection with practising golf comprising in combination, a frame having a suitable opening through which the ball is driven, and an elastic band secured to said frame and extending across said opening.

3. A device for use in connection with practising golf comprising a frame, a deformable obstructing member located in the opening of said frame and an inclined inner surface on said frame opposite said obstructing member.

4. A device for use in connection with practising golf, comprising a U-shaped frame, a flexible member extending across said opening, and an inclined inner surface opposite said flexible member.

5. A device for use in connection with practising golf comprising a frame having a suitable opening therein, a flexible member located in said opening and adjustable supporting feet on said frame.

6. A device for use in connection with practising golf, comprising a frame having a suitable opening therein, a flexible member located in said opening, an inclined inner surface on said frame opposite said member and adjustable supporting feet on said frame.

In testimony whereof I affix my signature in presence of two witnesses.

CHARLES HAMILTON MINSHALL.

Witnesses:
T. SELBY WANDLE,
W. I. S. MERTEN.

---

Copies of this patent may be obtained for five cents each, by addressing the "Commissioner of Patents, Washington, D. C."